United States Patent
Thomys et al.

(10) Patent No.: US 11,084,477 B2
(45) Date of Patent: Aug. 10, 2021

(54) METHOD AND DEVICE FOR OPERATING A MOTOR VEHICLE, MOTOR VEHICLE

(71) Applicant: Robert Bosch GmbH, Stuttgart (DE)

(72) Inventors: Adrian Thomys, Murr (DE); Martin Knopp, Markgroeningen (DE); Tobias Hoffmann, Ruelzheim (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 16/468,105

(22) PCT Filed: Oct. 19, 2017

(86) PCT No.: PCT/EP2017/076717
§ 371 (c)(1),
(2) Date: Jun. 10, 2019

(87) PCT Pub. No.: WO2018/114091
PCT Pub. Date: Jun. 28, 2018

(65) Prior Publication Data
US 2020/0101958 A1    Apr. 2, 2020

(30) Foreign Application Priority Data

Dec. 21, 2016   (DE) .......................... 102016225693.9

(51) Int. Cl.
*B60T 15/04*     (2006.01)
*B60W 10/188*    (2012.01)
(Continued)

(52) U.S. Cl.
CPC ............ *B60T 15/041* (2013.01); *B60T 15/14* (2013.01); *B60W 10/188* (2013.01);
(Continued)

(58) Field of Classification Search
CPC .... B60T 15/041; B60T 15/14; B60T 2270/14; B60T 8/17; B60T 8/171; B60T 13/66;
(Continued)

(56) References Cited

U.S. PATENT DOCUMENTS 5,000,295 A * 3/1991 Fargier .................. B60T 13/741
188/72.1
6,373,210 B2 * 4/2002 Roth-Stielow ............ H02P 3/04
318/362

(Continued)

FOREIGN PATENT DOCUMENTS

CN          104192107 A     12/2014
DE      102014218068 A1      3/2016
(Continued)

OTHER PUBLICATIONS

English translation of DE-102014218068 (Year: 2016).*
(Continued)

*Primary Examiner* — Melody M Burch
(74) *Attorney, Agent, or Firm* — Norton Rose Fulbright US LLP; Gerard Messina

(57) ABSTRACT

A motor vehicle includes at least one hydraulically actuatable wheel braking device and at least one electric drive motor. A method for operating the vehicle includes monitoring a driver behavior upon an emergency braking operation, and activating the hydraulic wheel braking device for generating a hydraulic emergency braking torque when an emergency braking operation is detected. When the emergency braking torque is detected, the drive motor is also operated as a generator in order to generate an additional electrical emergency braking torque.

10 Claims, 2 Drawing Sheets

(51) Int. Cl.
  *B60T 15/14* (2006.01)
  *B60W 40/09* (2012.01)
  *B60W 50/08* (2020.01)
(52) U.S. Cl.
  CPC ............ *B60W 40/09* (2013.01); *B60W 50/08* (2013.01); *B60T 2270/14* (2013.01)
(58) Field of Classification Search
  CPC .... B60T 13/74; B60T 13/745; B60T 2220/04; B60T 2270/60; B60T 2270/608; B60W 10/188; B60W 40/09; B60W 50/08
  See application file for complete search history.

(56) References Cited

U.S. PATENT DOCUMENTS

| | | | |
|---|---|---|---|
| 9,452,743 B2* | 9/2016 | Azzi | B60T 8/172 |
| 2007/0158148 A1* | 7/2007 | Ohtani | F16D 65/18 |
| | | | 188/158 |
| 2010/0161193 A1* | 6/2010 | Piel | B60T 8/4275 |
| | | | 701/78 |
| 2012/0256476 A1* | 10/2012 | Kunz | B60T 13/165 |
| | | | 303/3 |
| 2015/0041257 A1* | 2/2015 | Baehrle-Miller | B60T 13/74 |
| | | | 188/1.11 E |

FOREIGN PATENT DOCUMENTS

| | | |
|---|---|---|
| JP | 2000264184 A | 9/2000 |
| JP | 2007147081 A | 6/2007 |

OTHER PUBLICATIONS

International Search Report dated Jan. 31, 2018 of the corresponding International Application PCT/EP2017/076717 filed Oct. 19, 2017.

* cited by examiner

METHOD AND DEVICE FOR OPERATING A MOTOR VEHICLE, MOTOR VEHICLE

CROSS-REFERENCE TO RELATED APPLICATIONS

The present application is the national stage of International Pat. App. No. PCT/EP2017/076717 filed Oct. 19, 2017, and claims priority under 35 U.S.C. § 119 to DE 10 2016 225 693.9, filed in the Federal Republic of Germany on Dec. 21, 2016, the content of each of which are incorporated herein by reference in their entireties.

FIELD OF THE INVENTION

The present invention relates to a method for operating a motor vehicle that includes at least one hydraulically actuatable braking device and at least one electric drive motor, a driver behavior being monitored for an emergency braking operation, and the hydraulic braking device being activated for generating a hydraulic emergency braking torque when an emergency braking operation is detected. The present invention also relates to a device, in particular, a control unit, that carries out the above described method. The present invention further relates to a motor vehicle that includes such a device.

BACKGROUND

Conventional motor vehicles include a hydraulic braking system operable by the driver by actuating a brake pedal. By actuating the brake pedal, the braking force applied by the driver is introduced into the hydraulic braking system, for example, using a brake booster and/or of a brake master cylinder into the hydraulic braking system. Normally, this system includes multiple wheel braking devices, each of which is assigned to one wheel of the motor vehicle in order to be able to generate individual wheel braking torques. In the process, corresponding valves are activated in an automated manner by an ABS system or ESP system in order to enable an optimal braking operation.

If the driver initiates an emergency braking by, for example, actuating the brake pedal rapidly and with great force, the wheel brakes are activated to generate a maximally high braking torque, which still permits a sufficiently safe driving operation of the motor vehicle. Thus, by monitoring the brake pedal actuation, it is possible to monitor the driver behavior as to whether the driver might wish to initiate an emergency braking operation.

At the present time, motor vehicles which, in addition or alternatively to a conventional internal combustion engine drive, also include one or multiple electric drive motors capable of being operated as a generator and as a motor, are also becoming increasingly prevalent. In some cases, it is already known for initiating a braking operation, to not utilize the hydraulic braking system, but to operate the drive motor as a generator, in order, for example, to generate electrical power for the power supply of the motor vehicle during long downhill drives or the like. This braking recuperation mode is therefore used essentially for energy recovery.

SUMMARY

According to an example embodiment of the present invention, a method is provided that has an advantage that, during an emergency braking operation, the motor vehicle is decelerated more rapidly than previously. As a result of the present invention, the response time of the motor vehicle until a deceleration torque is exerted on the roadway via the wheels of the motor vehicle is shortened, so that the motor vehicle comes to a stop more rapidly than previously due to the shortened braking distance. This is achieved according to the present invention in that when the emergency braking operation is detected, the drive motor is operated as a generator, in order to generate an additional emergency braking torque. Thus, it is now provided that in addition to the hydraulic braking system, the drive motor is also operated as a generator during an emergency braking operation, in order to generate an additional (electrical) braking torque. This yields an advantage that, on the one hand, an increased braking torque overall is provided and, on the other hand, a braking torque is already provided early or earlier than previously to the wheels of the motor vehicle due to the rapid response time of the electric drive motor as compared to the hydraulic braking system. Due to the short response time of the drive motor, the drive motor supplies the braking, regenerative torque before a braking force is generated or perceptibly generated by the hydraulic braking system on the wheel brakes of the motor vehicle. As a result, the motor vehicle is decelerated earlier than before during an emergency braking operation and the response time of the motor vehicle or the braking distance is shortened accordingly.

According to an example embodiment of the present invention, it is provided that the drive motor is activated for generating a preferably maximum emergency braking torque. This ensures that the motor vehicle is decelerated as rapidly as possible.

It is provided, in particular, in this case that the drive motor is activated for generating the emergency braking torque, in particular, the maximum possible emergency braking torque, as rapidly as possible. In a short period of time, therefore, the drive motor provides a high braking torque, which is boosted during the further course of the emergency braking operation by the hydraulic emergency braking torque. According to an example embodiment of the present invention, it is provided that the maximally possible emergency braking torque is limited as a function of a wheel slip of the motor vehicle. This prevents one or multiple wheels of the motor vehicle from being blocked as a result of initiating the emergency braking operation and in this way prevents the directional stability from being compromised. The sensor system and evaluation unit of a conventional ABS system, for example, can be utilized to limit the maximally possible braking torque.

It is further preferably provided that the electrical braking torque is reduced as the hydraulic braking torque increases. Once a sufficiently high braking torque is generated by the hydraulic braking system, so that the maximally possible emergency braking torque is supplied or can be supplied by the hydraulic braking system alone, the electrical braking torque is reduced, so that the braking function is transferred to the hydraulic braking system. The transfer in this case takes place, in particular, continuously, so that the transfer is not noticed by the user and no sudden torque fluctuations occur that could result in a blocking or in a loss of static friction. As a result, this also yields an advantage that the drive motor operates for only a brief period of time with the high regenerative braking torque and, as a result, the load on the drive motor is kept within limits. Because the drive motor is intended to generate a preferably high braking torque, the load exceeds the normal load of the drive motor. By transferring the braking torque to the hydraulic braking system, the result is a high load on the drive motor for only a brief period of time, which causes no permanent damage or adverse effects to the drive motor. As a result, an energy store connected to the drive motor and/or a power output stage is/are protected against overload. According to an example embodiment of the present invention, it is also provided that electrical energy produced by the drive motor when operating as a generator is converted by an energy converter into heat. As a result, an energy store, that otherwise absorbs energy from the drive motor in the generator mode, can be protected from the high load, and the electrical energy can nevertheless be safely discharged. For this purpose, the electrical energy in the present case is converted into heat and thus conducted from the system in a simple manner.

An example embodiment of the present invention is directed to a device, for example, designed as a control unit, configured to carry out the described method. This results in the previously mentioned advantages.

An example embodiment of the present invention is directed to a motor vehicle including the described device. This also results in the previously mentioned advantages.

Additional advantages and preferred features and feature combinations result, in particular, from the above description as well as from the claims. The present invention is explained in greater detail below with reference to the drawings.

DETAILED DESCRIPTION

Figure 1:
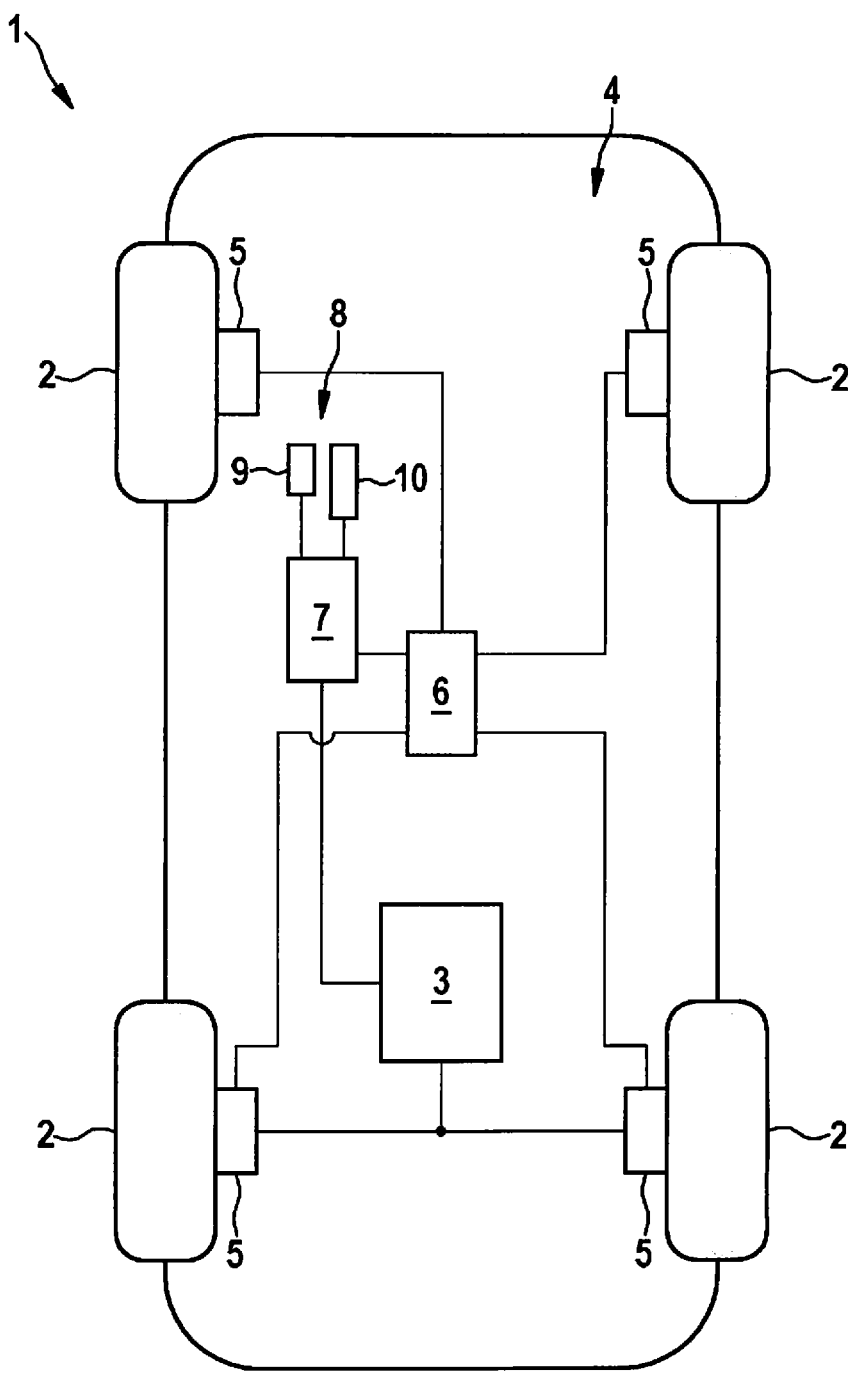
FIG. 1 shows a motor vehicle in a simplified top view, according to an example embodiment of the present invention.

FIG. 1 shows a simplified top view of a motor vehicle 1 that includes multiple wheels 2 with which vehicle 1 maintains contact with a roadway. Motor vehicle 1 includes at least one electric drive motor 3 mechanically connected at least to the wheels of one of the wheel axles, in the present case, the rear wheel axle, in order to drive the wheels in a motor-driven manner, or to apply a regenerative braking torque/deceleration torque to wheels 2 of this axle.

Motor vehicle 1 further includes a hydraulic braking system 4. Braking system 4 includes a hydraulically actuatable wheel braking device 5 for each of wheels 2, as well as a hydraulic central device 6 that includes actuatable valves for distributing a hydraulic pressure to wheel braking devices 5, in order to generate individual wheel braking torques on wheel brakes 5, for example. Central device 6 can thus be a conventional ABS device or ESP device.

Motor vehicle 1 also includes a control unit 7 connected to central device 6 and electric motor 3, in order to activate electric motor 3. Control unit 7 is also connected to a pedal system 8 of motor vehicle 1, which includes a brake pedal 9 and an accelerator pedal 10 and optionally a clutch pedal. More precisely, control unit 7 is connected to sensors of the pedals that monitor the respective pedal actuation.

If control unit 7 detects that brake pedal 9 is actuated at a speed and force which exceed a critical value, then it recognizes that the driver of the motor vehicle is initiating or can wish to initiate an emergency braking operation.

Normally, control unit 7 then activates central device 6 to hydraulically set a maximally high braking torque on wheel brakes 5, in order to achieve a preferably rapid deceleration of motor vehicle 1.

Figure 2:
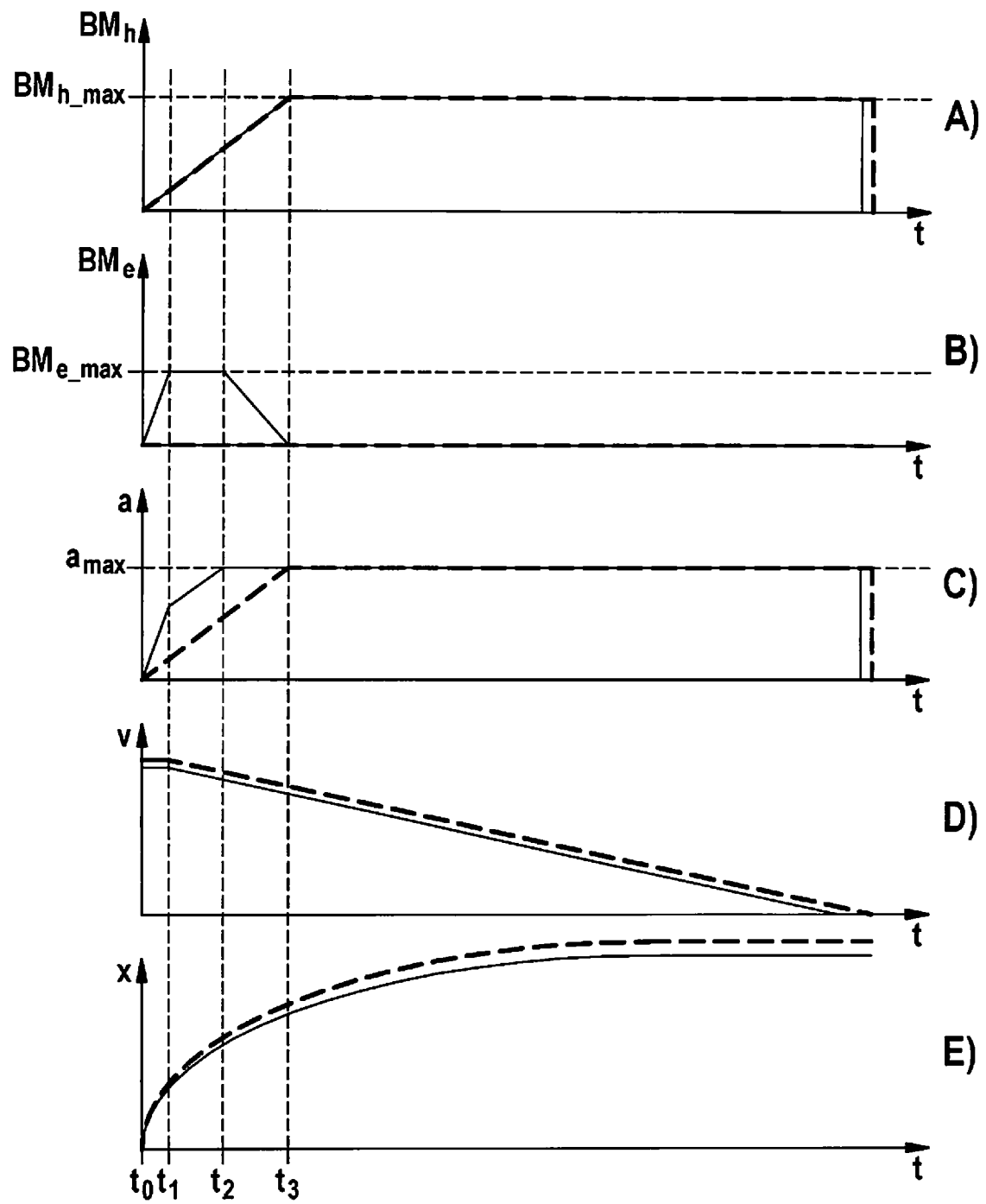
FIG. 2 includes diagrams for explaining a method for operating the motor vehicle according to an example embodiment of the present invention.

In this respect, FIG. 2 shows a diagram subdivided into multiple parts A-E. Part A shows hydraulic braking torque $BM_h$ plotted over time t, which is generated by hydraulic braking system 4 on wheel brakes 5. At point in time t0, the hydraulic pressure begins to increase until at point in time t3 it has reached the maximally possible value, which is limited to a maximum value $BM_{h\text{-}max}$ by central device 6 as a function of the static friction and of the wheel slip of wheels 2. It is apparent that some time elapses until the maximally possible braking torque is implemented on wheel brakes 5.

It is therefore advantageously provided that when it is established, based on the driver behavior, that an emergency braking operation is initiated, in particular, as described above by actuation of the brake pedal, electric drive motor 3 is then activated for generating a regenerative braking torque. It is provided, in particular, that electric motor 3 is activated for generating the regenerative braking torque as rapidly as possible and to set the braking torque as high as possible.

In addition, part B shows the profile of braking torque $BM_e$ generated by drive motor 3. This braking torque is also limited to a maximum value as a function of the adhesive strength of wheels 2 on the roadway, the maximum value being able to be ascertained, as before, for example, by the ABS system and corresponds, for example, to braking torque $BM_{h\_max}$.

The maximum electrical braking torque can also be limited by other influences such as, for example, the efficiency of drive motor 3 and/or of an electrical storage system assigned to drive motor 3 or of power electronics.

As is apparent based on parts A and B, drive motor 3 exhibits a significantly more rapid response time, so that the drive machine provides a high braking torque in a shorter period of time, as compared to hydraulic braking system 4.

In addition, part C shows the deceleration acting on motor vehicle 1 over time t, the dashed line showing the deceleration when motor vehicle 1 is decelerated/braked solely by hydraulic braking system 4, and the solid line showing the deceleration for the case in which, as previously described, drive motor 3 is also operated as a generator.

Here, an advantage of the described method is readily apparent. As a result of the additional regenerative braking torque of drive motor 3, the motor vehicle is decelerated earlier and more rapidly than with a purely hydraulic braking. The braking distance is thus shortened overall and the driving safety is enhanced as a result.

In addition, part D shows velocity v of the motor vehicle in the case of conventional braking by hydraulic braking system 4 (dashed line), as well as for the case in which drive motor 3 also provides a braking torque as described above.

Part E accordingly shows traveled distance x over time t, from the point in time the emergency braking operation for a conventional braking is initiated (dashed line) and for the case in which the advantageous method, including the additional regenerative braking torque, is carried out (solid line).

As previously described, the electrical braking torque is also limited by external influences, so that the electrical braking torque is held constant from point in time t1 when the maximally possible or permissible braking torque is reached. The electrical braking torque is reduced at a point in time t2, even before the hydraulic braking torque has reached the maximum possible value $BM_{h\_max}$. In this case, it is assumed that at point in time t2, the hydraulic braking torque is so high that it is then able to achieve or assume the braking function even without the regenerative braking torque of drive motor 3. Thus, as the hydraulic braking torque increases, the electrical braking torque is reduced at a point in time t2, so that the braking function is ultimately transferred to the hydraulic braking system. The result of this is that electric drive motor 3 is loaded by the braking operation for only a short period of time. However, the short-term load is also sufficient to improve the braking behavior of motor vehicle 1 overall and to shorten the braking distance, as previously explained above. The result of the short-term operation of drive motor 3 is also that the drive motor is not overloaded, in particular, not overheated. Energy generated by the electric motor operating as a generator is advantageously converted to heat, a corresponding heat converter being advantageously present for such purpose. An interior heater, for example, can also be utilized for this purpose in order to dissipate the heat.

As a further result of the early reduction of the electrical braking torque, the ABS regulation of braking system 4 is not influenced by drive motor 3, which increases the lane keeping safety of motor vehicle 1. An energy store assigned to drive motor 3 is also protected from overloading.

Control unit 7, which in the present case is depicted separately from central device 6, can of course be integrated into the ABS system or braking system 4, so that braking system 4 itself can activate drive motor 3. The advantageous method is readily integratable into existing structures of a motor vehicle and can therefore also be integrated subsequently into existing structures.

What is claimed is:

1. A method for operating a motor vehicle that includes a hydraulically actuatable wheel brake and an electric drive motor, the method comprising:
    monitoring a driver behavior;
    based on the monitoring, detecting an emergency braking operation; and
    in response to the detection of the emergency braking operation:
        initiating application of a hydraulic emergency braking torque to gradually increase to reach a target hydraulic emergency braking torque value by activating the wheel brake;
        immediately applying an electrical emergency braking torque by operating the drive motor as a generator causing the electrical emergency braking torque to reach a target electrical emergency braking torque value while the hydraulic emergency braking torque is gradually increased towards the target hydraulic emergency braking torque value; and
        after the target electrical emergency braking torque value is reached, and while the hydraulic emergency braking torque is gradually increased towards the target hydraulic emergency braking torque value, controlling the drive motor to reduce the electrical emergency braking torque, the target hydraulic emergency braking torque value thereafter being reached;
    wherein:
        (a) the controlling the drive motor to reduce the electrical emergency braking torque is a start, prior to the target hydraulic emergency braking torque value being reached, of a gradual reduction of the electrical emergency braking torque to 0, without an increase of the electrical emergency braking torque between the start and end of the gradual reduction;
        (b) the electrical emergency braking torque is controlled in response to the detection of the emergency braking operation such that, while the hydraulic emergency braking torque gradually increases to the target hydraulic emergency braking torque value:
            the electrical emergency braking torque initially increases to the target electrical emergency braking torque value in a first period;
            the electrical emergency braking torque is maintained at the target electrical emergency braking torque value in a second period that immediately follows the first period; and
            the electrical emergency braking torque is gradually reduced from the target electrical emergency braking torque value in a third period that immediately follows the second period; and/or
        (c) the reduction of the electrical emergency braking torque and the activating of the wheel brake are performed such that the target hydraulic emergency braking torque value is reached, at which point a value of the electrical emergency braking torque is reduced to 0.

2. The method of claim 1, wherein the operating of the drive motor is such that a maximally possible emergency braking torque is produced prior to the reduction.

3. The method of claim 2, wherein the maximally possible emergency braking torque is limited as a function of a wheel slip or of a static friction of the wheels of the motor vehicle on a roadway.

4. The method of claim 1, further comprising an energy converter converting electrical energy resulting when the drive motor is operated to heat.

5. A control unit for operating a motor vehicle that includes a hydraulically actuatable wheel brake and an electric drive motor, the control unit comprising a processor, wherein the processor is configured to:
    monitor a driver behavior;
    based on the monitoring, detect an emergency braking operation; and
    in response to the detection of the emergency braking operation:
        initiate application of a hydraulic emergency braking torque to gradually increase to reach a target hydraulic emergency braking torque value by activating the wheel brake;
        immediately apply an electrical emergency braking torque by operating the drive motor as a generator causing the electrical emergency braking torque to reach a target electrical emergency braking torque value while the hydraulic emergency braking torque is gradually increased towards the target hydraulic emergency braking torque value; and
        after the target electrical emergency braking torque value is reached, and while the hydraulic emergency braking torque is gradually increased towards the target hydraulic emergency braking torque value, control the drive motor to reduce the electrical emergency braking torque, the target hydraulic emergency braking torque value thereafter being reached;
    wherein:
        (a) the control of the drive motor to reduce the electrical emergency braking torque is a start, prior to the target hydraulic emergency braking torque value being reached, of a gradual reduction of the electrical emergency braking torque to 0, without an increase of the electrical emergency braking torque between the start and end of the gradual reduction;

(b) the electrical emergency braking torque is controlled in response to the detection of the emergency braking operation such that, while the hydraulic emergency braking torque gradually increases to the target hydraulic emergency braking torque value:
the electrical emergency braking torque initially increases to the target electrical emergency braking torque value in a first period;
the electrical emergency braking torque is maintained at the target electrical emergency braking torque value in a second period that immediately follows the first period; and
the electrical emergency braking torque is gradually reduced from the target electrical emergency braking torque value in a third period that immediately follows the second period; and/or
(c) the reduction of the electrical emergency braking torque and the activating of the wheel brake are performed such that the target hydraulic emergency braking torque value is reached, at which point a value of the electrical emergency braking torque is reduced to 0.

6. A vehicle comprising:
a hydraulically actuatable wheel brake;
an electric drive motor; and
a processor, wherein the processor is configured to:
monitor a driver behavior;
based on the monitoring, detect an emergency braking operation; and
in response to the detection of the emergency braking operation:
initiate application of a hydraulic emergency braking torque to gradually increase to reach a target hydraulic emergency braking torque value by activating the wheel brake;
immediately apply an electrical emergency braking torque by operating the drive motor as a generator causing the electrical emergency braking torque to reach a target electrical emergency braking torque value while the hydraulic emergency braking torque is gradually increased towards the target hydraulic emergency braking torque value; and
after the target electrical emergency braking torque value is reached, and while the hydraulic emergency braking torque is gradually increased towards the target hydraulic emergency braking torque value, control the drive motor to reduce the electrical emergency braking torque, the target hydraulic emergency braking torque value thereafter being reached;
wherein:
(a) the control of the drive motor to reduce the electrical emergency braking torque is a start, prior to the target hydraulic emergency braking torque value being reached, of a gradual reduction of the electrical emergency braking torque to 0, without an increase of the electrical emergency braking torque between the start and end of the gradual reduction;
(b) the electrical emergency braking torque is controlled in response to the detection of the emergency braking operation such that, while the hydraulic emergency braking torque gradually increases to the target hydraulic emergency braking torque value:
the electrical emergency braking torque initially increases to the target electrical emergency braking torque value in a first period;
the electrical emergency braking torque is maintained at the target electrical emergency braking torque value in a second period that immediately follows the first period; and
the electrical emergency braking torque is gradually reduced from the target electrical emergency braking torque value in a third period that immediately follows the second period; and/or
(c) the reduction of the electrical emergency braking torque and the activating of the wheel brake are performed such that the target hydraulic emergency braking torque value is reached, at which point a value of the electrical emergency braking torque is reduced to 0.

7. The method of claim 1, wherein the reduction of the electrical emergency braking torque and the activating of the wheel brake are performed such that the target hydraulic emergency braking torque value is reached, at which point the value of the electrical emergency braking torque is reduced to 0.

8. The method of claim 1, wherein the electrical emergency braking torque is controlled in response to the detection of the emergency braking operation such that, while the hydraulic emergency braking torque gradually increases to the target hydraulic emergency braking torque value:
the electrical emergency braking torque initially increases to the target electrical emergency braking torque value in the first period;
the electrical emergency braking torque is maintained at the target electrical emergency braking torque value in the second period that immediately follows the first period; and
the electrical emergency braking torque is gradually reduced from the target electrical emergency braking torque value in the third period that immediately follows the second period.

9. The method of claim 8, wherein, in the third period, the electrical emergency braking torque is gradually reduced to the value of 0 so that the emergency braking operation is then performed with the hydraulic emergency braking torque at the target hydraulic emergency braking torque value and the electrical emergency braking torque at the value of 0.

10. The method of claim 1, wherein the controlling the drive motor to reduce the electrical emergency braking torque is the start, prior to the target hydraulic emergency braking torque value being reached, of the gradual reduction of the electrical emergency braking torque to 0, without an increase of the electrical emergency braking torque between the start and end of the gradual reduction.

* * * * *